H. R. HEYL.

Assignor to AMERICAN PAPER-BOX MACHINE CO.

PAPER-BOXES.

No. 7,488.

Reissued Feb. 6, 1877.

WITNESSES

Walter Allen

Henry Tanner.

INVENTOR

Henry R. Heyl

By Knight Bros Attorneys

UNITED STATES PATENT OFFICE.

HENRY R. HEYL, OF PHILADELPHIA, PA., ASSIGNOR TO THE AMERICAN PAPER BOX MACHINE COMPANY, OF SAME PLACE.

IMPROVEMENT IN PAPER BOXES.

Specification forming part of Letters Patent No. 152,636, dated June 30, 1874; reissue No. 7,488, dated February 6, 1877; application filed September 21, 1874.

*To all whom it may concern:*

Be it known that I, HENRY R. HEYL, of the city and county of Philadelphia, in the State of Pennsylvania, have invented a new and useful Improvement in the Manufacture of Paper Boxes, of which the following is a specification:

My invention consists in making paper boxes of tubular form, with one or both ends constructed with closing flaps, to fold one upon another, the outer or last-folded flap being held down by its two loose corners entering slots or openings in the flap below.

The chief object of this invention is to provide paper boxes complete in one piece of paper or pasteboard, which shall be capable of being quickly closed and securely fastened shut without the aid of tying-cord or cement.

Figure 1:
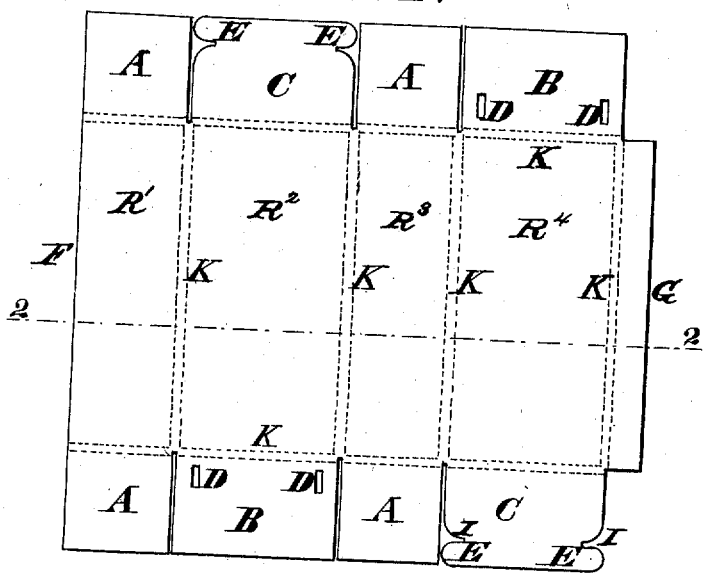
Figure 2:
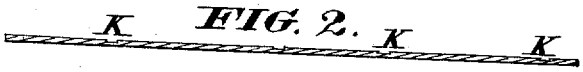
Figure 3:
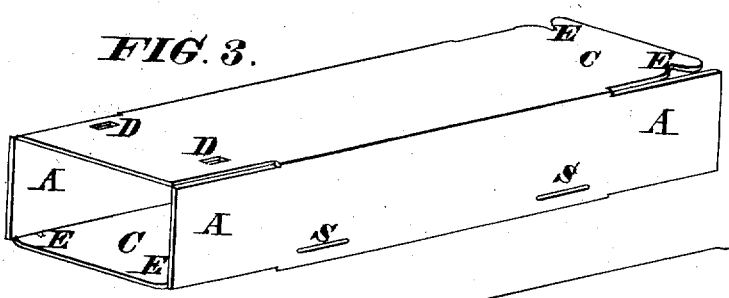
Figure 4:
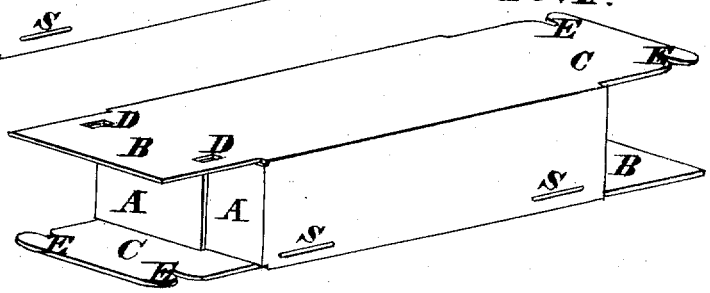
Figure 5:
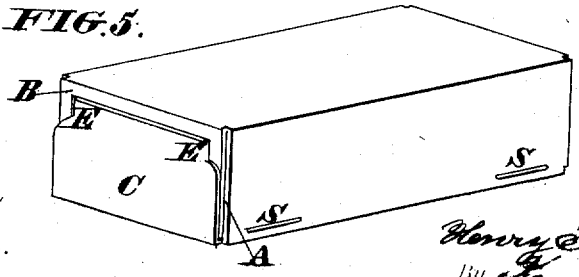

In the accompanying drawings, Figure 1 is a plan of a box-blank, shaped, slit, and kerfed in readiness for folding. Fig. 2 is a transverse section on the line 2 2, Fig. 1. Fig. 3 is a perspective view of the same folded in tubular form, preparatory to the closing of the ends. Fig. 4 is a perspective view of the same, with the ends partially closed. Fig. 5 is a perspective view of the closed box or package.

The blank for my box is made, preferably, of two united thicknesses of material, and shaped essentially as illustrated in Fig. 1, the proportions being varied according to the size and shape of the box desired.

On the side of the blank which is to form the inside of the box I make excavated kerfs K of shallow depth and extreme width on the lines of the desired folds, so that while the box is not materially weakened thereby, I am still enabled to bend very heavy box-pasteboard entirely double without cracking or otherwise injuring the outer face of the box at its corners.

The blank is then formed into an angular tube by securing the side F to the narrow flap G; and I prefer to secure the joint by seaming it with wire staples instead of using cement. Each extremity of the tube thus formed will be seen to consist of separated flaps A A B C, equal in number to the sides of the tube. In this illustration of a rectangular tube or box, A A represent the first-closed or inner flaps; B, the third flap, provided with the slits or openings D D, cut at an angle to the fold or hinge of said flaps, to receive the corners E E of the fourth or outer flap, C.

In closing the flaps in the order heretofore described, the two corners E E of the outer flap are introduced into the slits D D, which secures all the flaps from opening.

By thus confining the corners of the outer flap it is held down closely and securely, and is much less liable to be opened in handling the box than when the flap is held by one or more tongues inserted in a slit or slits parallel with the fold or hinge of the said flap.

As a still more effective means of securing the flaps against accidental opening, I have made notches I I, one at either side of the outer flap and near the corners E E, so as to impart to these corners the form of tongues; and, by making the slits D D in a direction lateral to the fold or hinge of the last-closed flap, these tongue-shaped corners may be inserted in the slits or slots laterally. This is done by bending the flap, so as to shorten its free end; then the tongues may be entered into the slots, and, by letting the flap straighten, the tongues enter deeper into the slots and effectually lock the flaps together, so that no pressure from within the box can open them.

Having thus described my invention, the following is what I claim as new, and desire to secure by Letters Patent:

1. A paper box formed from the within-described pasteboard blank, constructed with the four sides $R^1$ $R^2$ $R^3$ $R^4$, the lap G, and four closing end flaps, A A B C, at either end, and with excavated kerfs on all the lines forming the inner angles of the box, substantially as described.

2. The within-described paper box having four closing end flaps, A A B C, at either end, which are so constructed that two of said end flaps do interlock with each other by the introduction of the two corners of one of the flaps into two slits or openings, D D, formed in the opposite flap, said openings being made at an angle to the fold or hinge of said flap, substantially as described.

3. A paper or pasteboard box secured in a tubular form, and closed at one or both ends by portions of the sides thereof bent over and locked into each other by means of the tongue-shaped corners E E being sprung laterally into the corresponding slots or long openings D D made in the opposite flap, lateral to the fold or hinge thereof, substantially as described.

4. A box constructed from a blank having at either end flaps A A B C and fastening-slits D, and secured in tubular form by a seam of wire staples, S, applied substantially as set forth.

HENRY R. HEYL.

Witnesses:
A. H. EVERHARD,
HUGO BREHMER.